May 28, 1963 R. J. RANDLES 3,091,752

ERROR DETECTION CIRCUIT FOR INSTRUCTION DECODERS

Filed Dec. 31, 1958 5 Sheets-Sheet 1

INVENTOR.
RICHARD J. RANDLES

BY George Baron

ATTORNEY

May 28, 1963 R. J. RANDLES 3,091,752

ERROR DETECTION CIRCUIT FOR INSTRUCTION DECODERS

Filed Dec. 31, 1958 5 Sheets-Sheet 2

ERROR DETECTION CIRCUIT FOR INSTRUCTION DECODERS

Filed Dec. 31, 1958

FIG. 3 FLIP-FLOP

GATE

ERROR DETECTION CIRCUIT FOR INSTRUCTION DECODERS

3,091,752
ERROR DETECTION CIRCUIT FOR INSTRUCTION DECODERS

Richard J. Randles, Rhinebeck, N.Y., assignor to International Business Machines Corporation, New York, N.Y., a corporation of New York Filed Dec. 31, 1958, Ser. No. 784,187
5 Claims. (Cl. 340—146.1)

This invention relates to error detection circuits for computers, and more particularly to the detection of errors taking place either in the transfer of information to an instruction register, or in the decoding of such information in the instruction register.

Computers are being used widely in military applications where error-free operation is almost mandatory. If error-free operation is not attainable, at least it is necessary to detect errors immediately upon their occurrence so that they are not processed or operated upon by other portions of the computer. Of course, there is a limit as to how many components and circuits can be checked in that the weight and cost of the checking equipment themselves may be prohibitive. Consequently, error checking is often confined to those portions of the computer wherein an undetected error will result in time-consuming or serious miscalculations.

The present invention provides a checking system employing the checking of parity bits as a means for detecting errors in decoding of an instruction as well as detecting errors that arise in transferring an instruction from the memory buffer register of a computer to the instruction register of such computer. The outputs of the instruction register are decoded and sent through two OR circuits. One OR circuit accepts all even parity inputs, each OR circuit strobing an appropriate gate conditioned by a parity flip-flop. An incorrect output from the instruction register decoder will cause a parity alarm while the absence of any output will result in conditioning an alarm flip-flop so that the latter will actuate an alarm signal when it is sampled. More than one output of the same parity or failures in any flip-flops in a second register to which the decoded instruction is transmitted will be detected in a second phase of the test.

Such second phase will include a first string of gates that are conditioned by the outputs of the flip-flops in the second register. Outputs of such first string of gates are sampled at a first time period. Incorrect operation of the flip-flops in which one or more flip-flops of opposite parity are selected will be detected, as well as no selection of any flip-flops. The detection of failures wherein two or more flip-flops of the second register that are conducting are of like parity is accomplished by employing an additional flip-flop, a second string of gates, and unique time pulses in a manner more fully explained in the accompanying description of the invention. The checking circuit will detect single errors in transferring information from a memory buffer to an instruction register and will also detect multiple types of failures that may take place when the instruction register is decoded.

Consequently it is an object of this invention to detect errors during the decoding of an instruction.

It is a further object to detect all single failures in equipment associated with an instruction register and decoder.

It is yet another object to provide such error-checking circuitry that relies on relatively few additional components to achieve such error-checking.

Other objects of the invention will be pointed out in the following description and claims and illustrated in the accompanying drawings which disclose, by way of example, the principle of the invention and the best mode, which has been contemplated, of applying that principle, wherein FIG. 1 is a schematic diagram of an embodiment of the instruction control error checking circuit.

Figure 1:
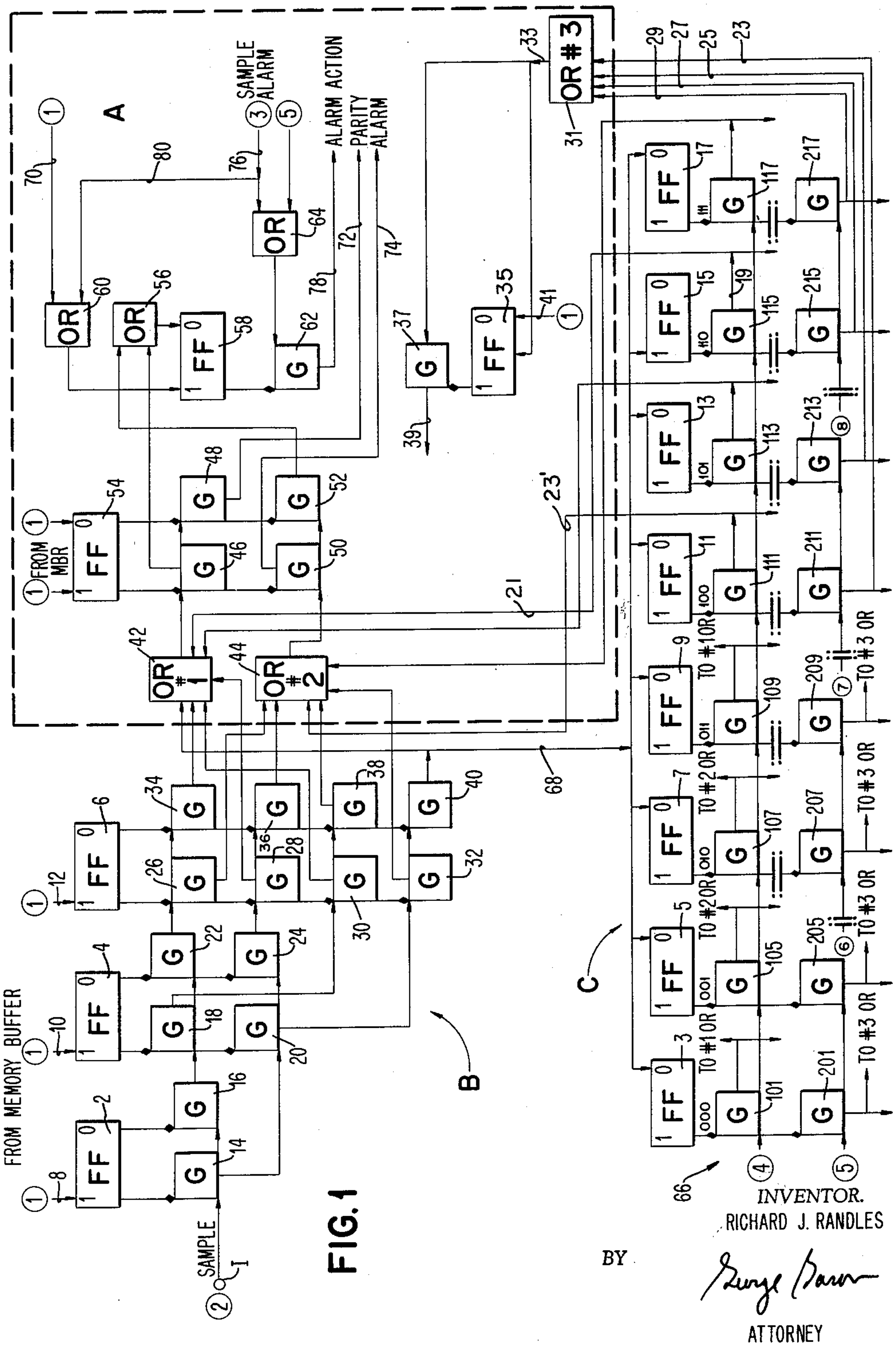

Referring to FIG. 1, there is shown an error-checking circuit broken down into three main sections A, B, and C. Section A is shown within dotted lines and relates to that portion of the invention that houses the checking equipment. Section B appears to the left of the dotted box and refers to that portion of the invention that decodes the binary instruction that has been obtained from the memory buffer. The decoded instruction is in pulse form and section C, which is shown below the checking equipment and decoder, is a storage register for storing the decoded information as a D.C. level. The checking of this D.C. level is a step in the determination of the presence of errors arising in the transfer of the instruction.

Section B includes a plurality of flip-flops 2, 4, and 6 forming a register which stores the binary coded instruction entering the register through input circuits represented by lines 8, 10, and 12, such coded instruction pulses entering the flip-flop register from a memory buffer, not shown. Gates 14, 16, . . . 40 are conditioned in accordance with the respective binary states of flip-flops 2, 4 and 6, it being noted that a diamond-shaped arrow indicates a D.C. level whereas a triangular-shaped arrow is indicative of a short duration pulse.

When a sampling pulse is applied at input terminal I, gates 14–40 decode the binary instruction and the sampling pulse is gated through the decoding network so that it appears on only one output line associated with gates 26, 28, . . . and 40. Such output lines are labelled 000, 001, 010, . . . etc. and each conforms to a unique combination of "1's" and "0's" appearing in the register of flip-flops 2, 4 and 6. The output lines of the decoder gates feed into two OR circuits 42 and 44, such output lines being grouped so that all those lines representing an instruction having an even number of "1's" in the binary code will go through OR circuit 42 and those lines representing an odd number of "1's" will actuate OR circuit 44. It is noted that the binary words such as 001, 111, 101, etc. sent to the register from memory buffer represent instructions submitted to the instruction control unit of a computer. In the specific embodiment of the invention, the instruction 001 may represent a class of instructions representing a "shift" instruction, 111 may represent a class of instructions related to "resetting" and 101 may represent a class of "branching" instructions. Associated with each class of instructions will be a variation instruction, the latter being transmitted simultaneously with the class instruction from memory buffer register to a register (not shown), similar to the class register comprising flip-flops 2, 4, and 6. Thus a variation instruction for the "reset" class of instructions might be represented by the binary word 1011, the latter representing the instruction "Reset Index Register." Likewise the binary word 1000 could be a variation of the "branch" (class 101) instruction representing the instruction "Branch if Contents of Accumulator are all 0's." It will be understood that the manner of checking the class instruction to be described hereinafter can also be applied to the checking of the variation instructions.

The output signal pulses from OR circuit 42 sample gates 46 and 48 whereas the output signal pulses from OR circuit 44 sample gates 50 and 52. Flip-flop 54 is a parity flip-flop and the latter is set to its "1" or "0" state in accordance with the parity of the binary class instruction being sent to the register of flip-flops 2, 4, and 6. In order to illustrate the invention, it will be assumed that for correct parity, the parity of the sum of the instruction and its parity bit should be odd. Thus, if an instruction is "010," which has an odd parity of "1's," then the parity bit flip-flop 54 should be in its "0" state. If the instruction contains an even parity instruction, such as "011," then the parity flip-flop 54 would be set to its "1" state.

Gates 46 and 52 have their respective outputs feed into OR circuit 56 whereas the outputs of gates 48 and 50 feed into a partity alarm circuit not shown. Alarm flip-flop 58 is set to its "0" state by the output of OR circuit 56 whereas such alarm flip-flop 58 is set to its "1" state by the output of OR circuit 60. Gate 62 is conditioned by the "1" output side of flip-flop 58 and it is sampled by the output of OR circuit 64.

The outputs of gates 26–40 not only are fed to either OR circuit 42 or 44, but they are also transmitted to a register 66 of flip-flops 3, 5, 7, 9, 11, 13, 15, and 17. One circuit, represented by line 68, carries the output pulse of gate 40 to such register 66. It is understood that there are eight output circuits similar to that shown for line 68, but only one output line is shown so as not to complicate the drawing. The output circuit 68 is applied to the register of flip-flops 3, 5, . . . 17 so that such output circuit sets only one flip-flop 15 to the "1" state while setting the other flip-flops in the register 66 to their respective "0" states. Consequently the set flip-flop 15 will be conditioning its corresponding gate 115 while the remaining gates 101, 105, 107, 109, 111, 113, and 117 remain in their deconditioned states. The sampled gate 115 will produce an output along line 19 that is representative of the coded instruction 110, such output signal being fed back, via line 21, to OR circuit 42, the latter being the OR circuit that has its inputs thereto pulses representative of even parity instructions. It will be understood that gate 26, whose output circuit carries a signal representative of the instruction "001," will have associated therewith an output circuit similar to that represented by line 68 which will set flip-flop 5 to its "1" state but reset all the other flip-flops of register 66 to their respective "0" states. In like manner, gate 28 is associated with flip-flop 13, gate 30 with flip-flop 9, gate 32 with flip-flop 17, gate 34 with flip-flop 3, gate 36 with flip-flop 11, and gate 38 with flip-flop 7.

Each flip-flop in register 66 is associated with a column of gates, gates 101, 201, etc. forming one column, gates 105, 205, etc. forming a second column, etc. Such columns of gates, when conditioned by their corresponding flip-flops in register 66, will be capable of issuing commands, in the form of signal pulses, to other portions of the computer. Each gate 101, 105, . . . 117 will have an output circuit that feeds back to its corresponding OR circuit 42 or 44. For example, output circuit 23′ is connected to gate 111 and carries any signal pulse passed by the latter back to OR gate 44. Since flip-flop 11 represents an odd parity instruction, namely, "100," the output of gate 111 is tied in with the OR gate 44 that is the odd parity instruction gate. In a similar manner, gates 101, 105, . . . 117 will each have an output circuit such that all outputs representing an odd parity instruction will be fed back as inputs to OR circuit 44 and all outputs representing an even parity instruction will be fed back to OR circuit 42.

Each of the gates 201, 205, 207, . . . 217, besides having their output signals going to operate other flip-flops or circuitry, not shown, also feed such output signals along output circuits 23, 25, 27, 29, etc. to OR circuit 31. The output signal of OR circuit 31 appearing at terminal 33 serves to both complement flip-flop 35 and sample gate 37. The output terminal 39 carries an alarm signal to an appropriate alarm circuit when gate 37 passes signal pulses therethrough and input terminal 41 carries signals for setting flip-flop 35 to its "0" state.

The operation of the decoder checking circuit will now be described, it being understood that a circled numeral appearing next to an input terminal indicates the time during a given cycle at which an input signal appears thereat. At time $t_1$, the binary word instruction is taken from the memory buffer and read into the decoder register comprising flip-flops 2, 4, 6, the parity bit that accompanies the instruction also being transmitted to set parity flip-flop 54. At the same time alarm flip-flop 58 is set to its "1" state through OR circuit 60 along input circuit 70 and flip-flop 35 is set to its "0" state via input terminal 41. At time $t_2$, the decoder gates 14, 16, . . . 40 are sampled and the signals appearing on the output lines of OR gates 42 or 44 sample parity gates 46, 48, 50 and 52. In the example chosen to illustrate the invention, a parity bit is generated whenever the transmitted instruction contains an even number of "1's," which in effect means that correct transfer has taken place when the parity of the instruction plus the parity of the parity bit is odd. Obviously the logic can be modified to call for correct transfer when the latter sum is even.

If correct transfer has taken place, then either gate 46 or gate 52 will pass a pulse to OR circuit 56 so as to set alarm flip-flop 58 to its "0" state. If either parity gate 48 or 50 passes a pulse, then an alarm signal is transmitted along output circuits 72, 74 to an alarm circuit, not shown, immediately indicating that there has been an incorrect transfer of an instruction from the memory buffer. At the same time that the decoded instruction is transmitted to the checking circuit shown within the dotted box, a single flip-flop in register 66 corresponding to the decoded instruction will be set to its "1" state and the other flip-flops of such register 66 will be set to their respective "0" states. The setting of a flip-flop in register 66 to its "1" state will condition a column of gates associated with such flip-flop. If no output signal is passed by either OR circuit 42 or 44, then flip-flop 58 remains in its "1" state, conditioning gate 62.

At time $t_3$, a sampling pulse is applied at input terminal 76, such pulse passing through OR circuit 64 to be gated through 62 if flip-flop 58 were in its "1" state at the time of sampling. Since flip-flop 58 would be in its "1" state only if neither OR circuit 42, 44 had failed to produce an output, the gating of a sampling pulse at time $t_3$ by gate 62 along output circuit 78 would indicate such failure. The sampling pulse at time $t_3$ is also carried by input circuit 80 through OR circuit 60 to reset flip-flop 58 to its "1" state if a previous correct transfer has set the latter to its "0" state, or keep the flip-flop 58 in its "1" state if the sampling pulse at time $t_3$ finds it in the "1" state.

At time $t_4$ gates 101, 105, 107, . . . 117 are simultaneously sampled. Each gate, if it is conditioned by a flip-flop in register 66, will transmit a signal pulse back to its corresponding OR circuit 42 or 44. The sampling of gates 101, 105, . . . 117 at time $t_4$ checks whether or not the proper flip-flop in register 66 has been selected. Thus, if the single correct flip-flop of register 66 has been selected, the alarm circuit flip-flop 58 is set through OR circuit 56 to its "0" state. If the wrong flip-flop of register 66 has been selected, then a parity alarm signal will be transmitted along either line 72 or 74. If no output is produced at any gate 101, 105, etc., then alarm flip-flop 58 is left in its "1" state. The sampling of OR gate 64 at time $t_5$ will produce an output through gate 62 to indicate an alarm condition.

If there has been a selection of an incorrect flip-flop simultaneously with a selection of a correct flip-flop, and if such two flip-flops are of different parity, then at sampling time $t_4$ an alarm will be generated in either line 72 or 74.

If it should happen that a plurality of flip-flops in register 66 should be "up" or in their respective "1" states, and all of them are of the same parity, for example, all even or all odd, only one OR gate 42 or 44 will be actuated. Consequently it is possible that a plurality of flip-flops in register 66 could be set to their respective "1" states without being detectable by the sampling pulse at times $t_4$ and $t_5$. Gate 37, flip-flop 35, and OR gate 31 are combined to check for such plural failures in the following manner. When gates 201 and 205 are sampled at time $t_5$, if either gate is conditioned by its corresponding flip-flop, the former transmits the gated sampling pulse to OR circuit 31 so as to complement flip-flop 35 to its "1" state. The pulse appearing at gate 37 at this time is not passed by gate 37 because the switching time of flip-flop 35 is greater than the width of the output pulse appearing at terminal 33 of OR gate 31. If at time $t_6$, $t_7$, or $t_8$, any of the gates 207, 209, 211, 213, 215, or 217 pass a sampling pulse, gate 37 is now conditioned by the "1" side of flip-flop 35 and the passed sampling pulse will actuate an alarm, not shown. Such passed sampling pulse will also complement flip-flop 35 to its "0" state. Thus it is seen that at time $t_4$, the invention checks whether flip-flops of different parity in register 66 are "up" or in their "1" states, and at times $t_5$ to $t_8$, the checking circuit detects whether there are at least two flip-flops of the same parity in the "up" state.

Figure 2:
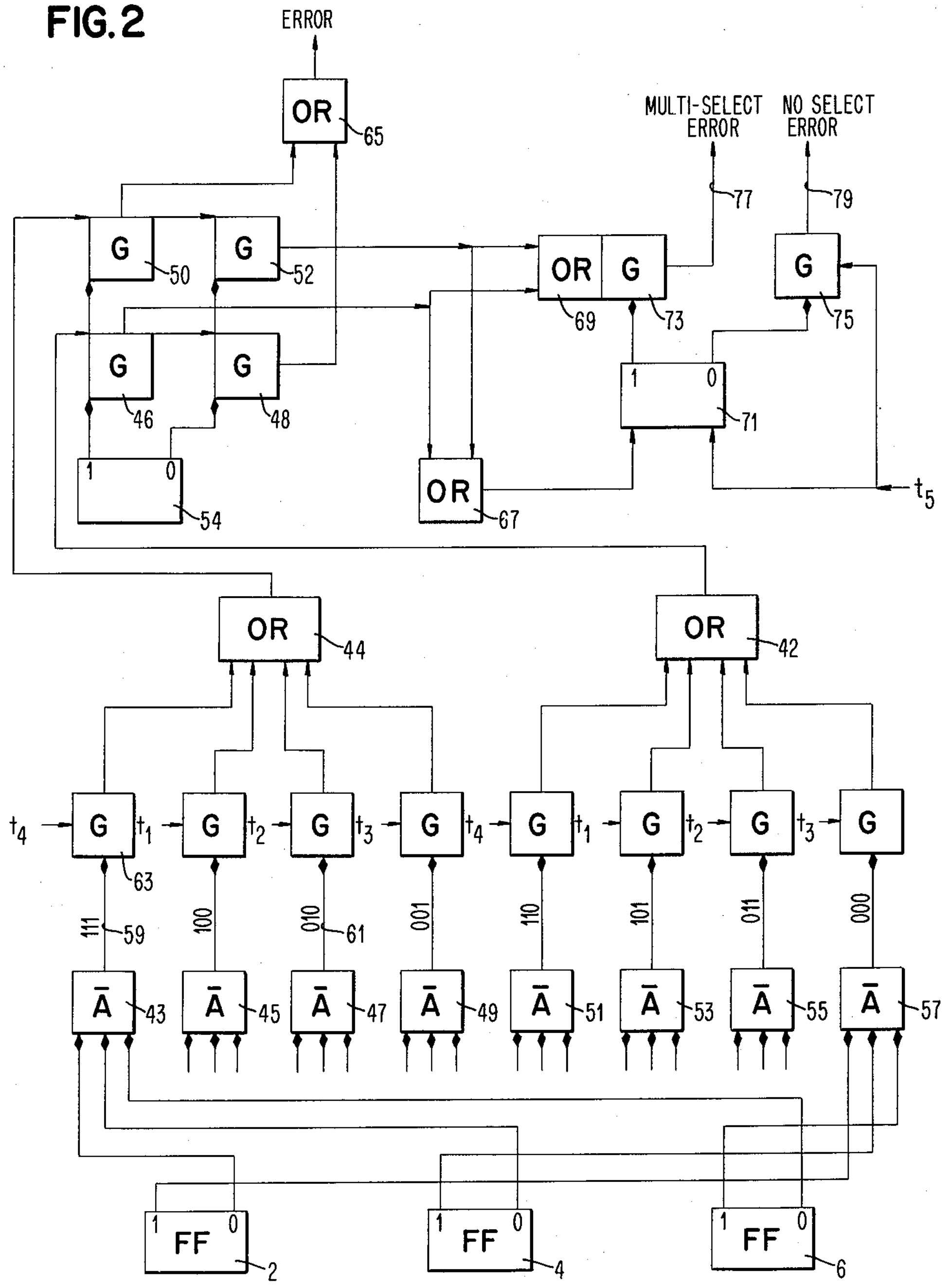
FIG. 2 is a modification of the invention shown in FIG. 1.

FIG. 2 is a modification of the checking circuit of FIG. 1 wherein D.C. AND NOT circuits replace the decoder gates 14, 16, . . . 40 and the number of components in the checking circuit is reduced, particularly in the manner in which the functions of alarm flip-flop 58 and flip-flop 35 are combined in a single flip-flop. Flip-flops 2, 4 and 6 are set in accordance with the binary coded instruction received from the memory buffer and, at the same time, the parity flip-flop 54 is set to the state of the transmitted parity bit. Unlike the circuit shown in FIG. 1, the outputs of flip-flops 2, 4, and 6 are fed into AND NOT circuits 43, 45, . . . 57 which decode the binary coded instruction. Each AND NOT circuit $\overline{A}$ is designed to produce the inverse of the inputs thereto. Thus, the signal appearing on output line 59 represents the decoded binary instruction "111," such being the inverse of the "000" states of the flip-flops 2, 4, 6. If the decoded instruction were "010," line 61 would be conducting, and the "1" output of flip-flop 2, the "0" output of flip-flop 4, and the "1" output of flip-flop 6 would be connected to the AND NOT circuit 47. Each AND NOT circuit, when conducting, conditions its associated gate, such as gate 63, and the outputs of the odd parity gates are fed into OR circuit 44 and the outputs of the even parity gates are fed into OR circuit 42. Like the circuit of FIG. 1, the outputs of OR circuit 42 samples gates 46 and 48 and the output of OR circuit 44 samples gates 50 and 52. Parity check failures are transmitted through OR circuit 65 to a suitable parity alarm indicator, gates 48 and 50 producing output signals when such lack of parity check occurs.

The output signals from gates 46 and 52 are sent to two OR gates 67 and 69, the output of OR circuit 67 being sent to set alarm flip-flop 71 to its "1" state, the "1" output of alarm flip-flop 71 conditioning gate 73, the latter passing, when conditioned, the output of OR circuit 69. Gate 75 is conditioned by the "0" state of alarm flip-flop 71.

The operation of the embodiment of the invention of FIG. 2 will now be described. The binary coded instruction is read into flip-flops 2, 4, and 6 and its accompanying parity bit is read into flip-flop 54. At time $t_1$, the "100" gate and "101" gate are sampled. At time $t_2$, the "011" and "010" gates are sampled. Similarly, at times $t_3$ and $t_4$, the gates of an odd and even parity instruction are simultaneously sampled. If there is a parity error at any one of these times, either gate 48 or gate 50 will actuate OR circuit 65 so that such parity error can be indicated at a suitable alarm station. If at a given sampling time, such as $t_2$, only the "011" gate is conditioned, then, for an odd parity system, gate 46 will produce an output signal pulse that will pass through OR circuit 67 and set alarm 71 to its "1" state. If it any subsequent sampling time, either the "011" gate or the "110" gate should be conditioned, the output pulse that would pass through OR gate 42 would go through OR circuits 67 and 69. The pulse through OR circuit 67 would only tend to keep alarm flip-flop 71 in its "1" state, so the pulse through conditioned gate 73 would pass along line 77 to a suitable alarm circuit, indicating that the decoder had a plurality, hence an incorrect number, of lines in the "up" condition. If none of the gates similar to gate 63 are conditioned, then there will be no outputs going to either OR circuit 67 or OR circuit 69. The lack of an input pulse at OR circuit 67 will mean that the alarm circuit flip-flop 71 does not get set to its "1" state. At time $t_5$, the gate 75 is sampled. Since flip-flop 71 is in its "0" state, the appearance of a signal pulse at output line 79 will indicate the failure due to lack of a signal appearing on any output circuit of the AND NOT decoder. In other words, such failure indicates no signal appearing at the output of the decoder.

Thus the embodiment of FIG. 2 checks the type of errors that the embodiment of FIG. 1 checked, namely, a parity error to determine whether or not the parity bit jibes with the binary instruction transmitted to flip-flops 2, 4, and 6 from the memory buffer; all errors wherein the decoder flip-flops of register 66 are producing a plurality of outputs or "up" conditions; and the error that exists when none of the flip-flops of such register 66 is in the "up" condition. The embodiment of FIG. 2 relies on fewer components than that of FIG. 1 in order to carry out the error detecting function.

Figure 3:
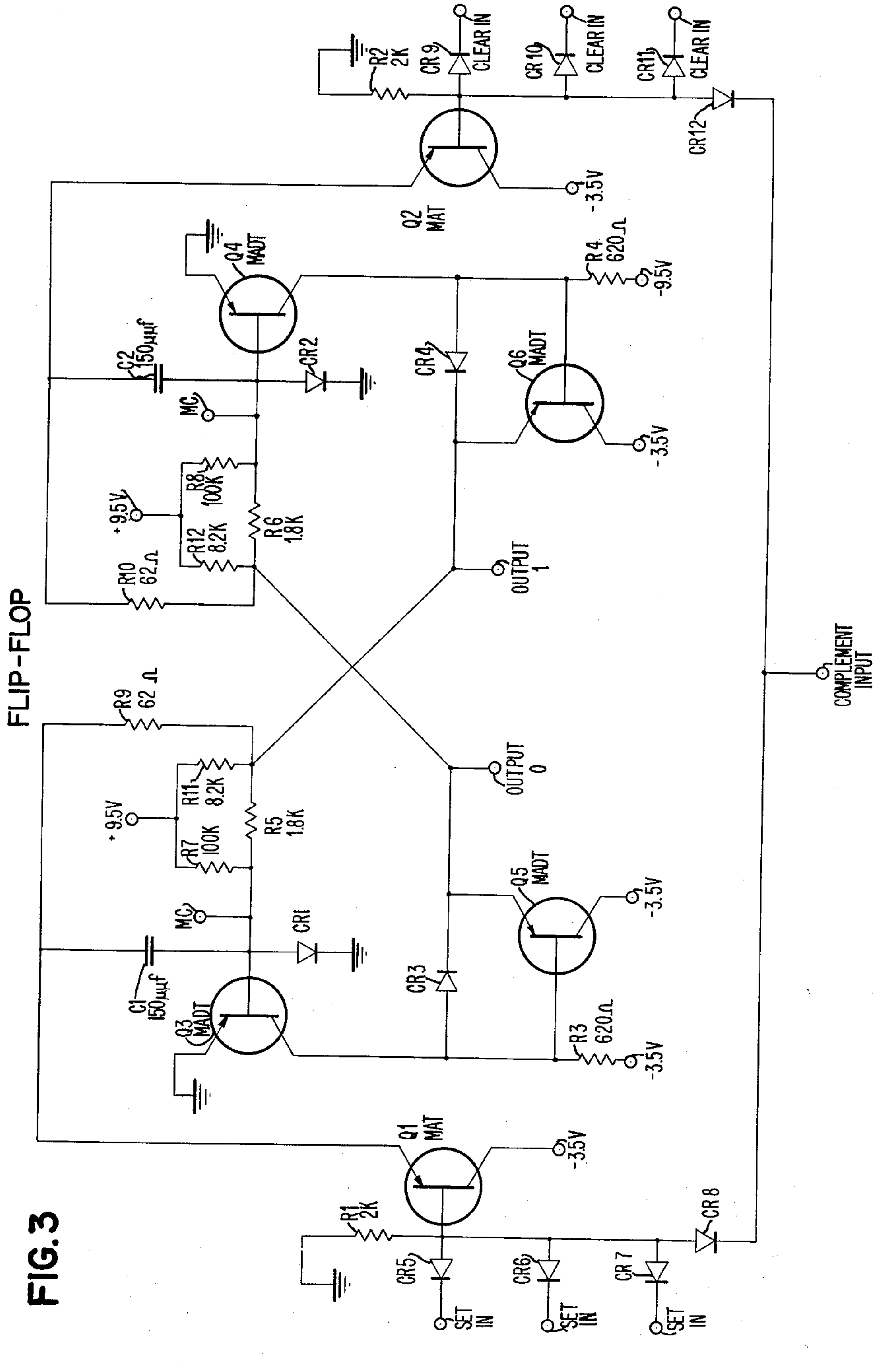
FIG. 3 is an example of a flip-flop which may be employed in the present invention.

FIG. 3 is a showing of a type of flip-flop that could be used in the checking circuits of FIGS. 1 and 2. Operation of the flip-flop takes place as follows: the flip-flop can be considered as operating in its steady state in either of two conditions, namely, in its upper level or "1" output state, or in its "0" output state at a lower level. Current flows from the +9.5 volt supply through $R_{11}$, $Q_6$, to the −3.5 volt supply. Another path of current flow is from the +9.5 volt supply through $R_{12}$, $Q_5$, to the −3.5 volt supply. No current flows through $R_{10}$ since the emitter-base junction of $Q_2$ is back biased with the emitter of $Q_2$ also at −3 volts. Application of a −3 pulse to the Complement Input terminal will cause the bases of $Q_1$ and $Q_2$ to approximately follow the input pulse wave shape. The fall transition of signal at the base of $Q_1$ appears at the emitter of $Q_1$ and is coupled through $C_1$ to the base of $Q_3$, and the emitter circuit of $Q_1$ is isolated from the low impedance path to ground. No change is noted at the emitter of $Q_2$ during the fall of the input, since this point is held at about −3 volts in the steady state. $Q_3$, which is cut off in the steady state, is switched to saturation by the negative transition at the base of $Q_3$, causing the "0" output to rise from its lower to its upper level. Such rises of the "0" output allows the emitter of $Q_2$ to start rising toward +9.5 volts. $C_2$ couples this rise at the emitter of $Q_2$ to the base of $Q_4$. $Q_4$ is turned off by this rise at the base of $Q_4$ causing the "1" output to fall to the lower level. $Q_3$ is maintained in its conducting state and the emitter of $Q_1$ is held at approximately the lower level in the steady state by the lower level at the "1" output. $Q_4$ is maintained off in the steady state by the upper level at the "0" output. The flip-flop is now in a stable state and will change to its original state upon receipt of a negative pulse either at its complement input or will change its state if a negative pulse is applied to the appropriate input, namely, at the "Set" input or the "Clear" input.

Figure 4:
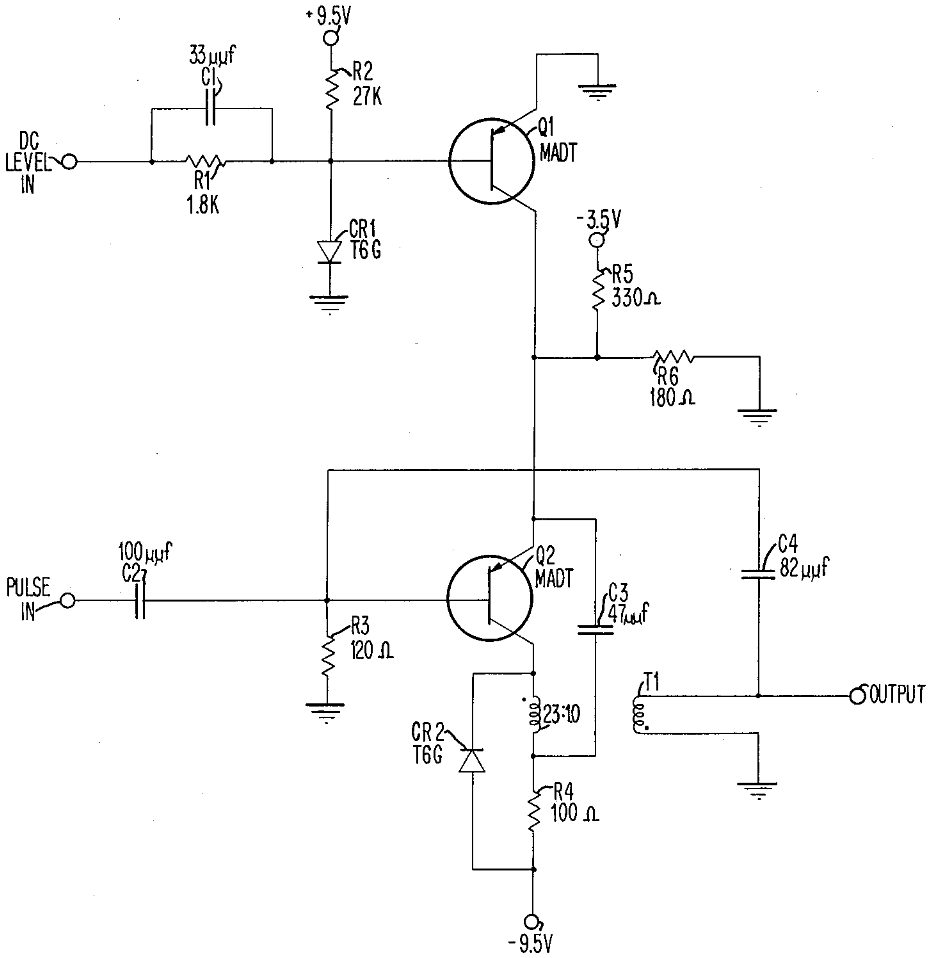
FIG. 4 is an example of a gate that can be employed in the present invention.

FIG. 4 illustrates a gate that could be employed for the gates, such as gates 50, 52, etc., shown in block form in FIGS. 1 and 2. It will be seen that the D.C. output level of a flip-flop is applied at the terminal of the gate labeled "D.C. level input" so as to condition such gate. When a negative pulse is applied at the terminal labeled "Pulse In" while such gate is conditioned, the output pulse appearing across primary winding $T_1$ is inverted by the secondary winding $T_2$ so that a negative pulse appears at the terminal labeled "Output."

Figures 5, 6:
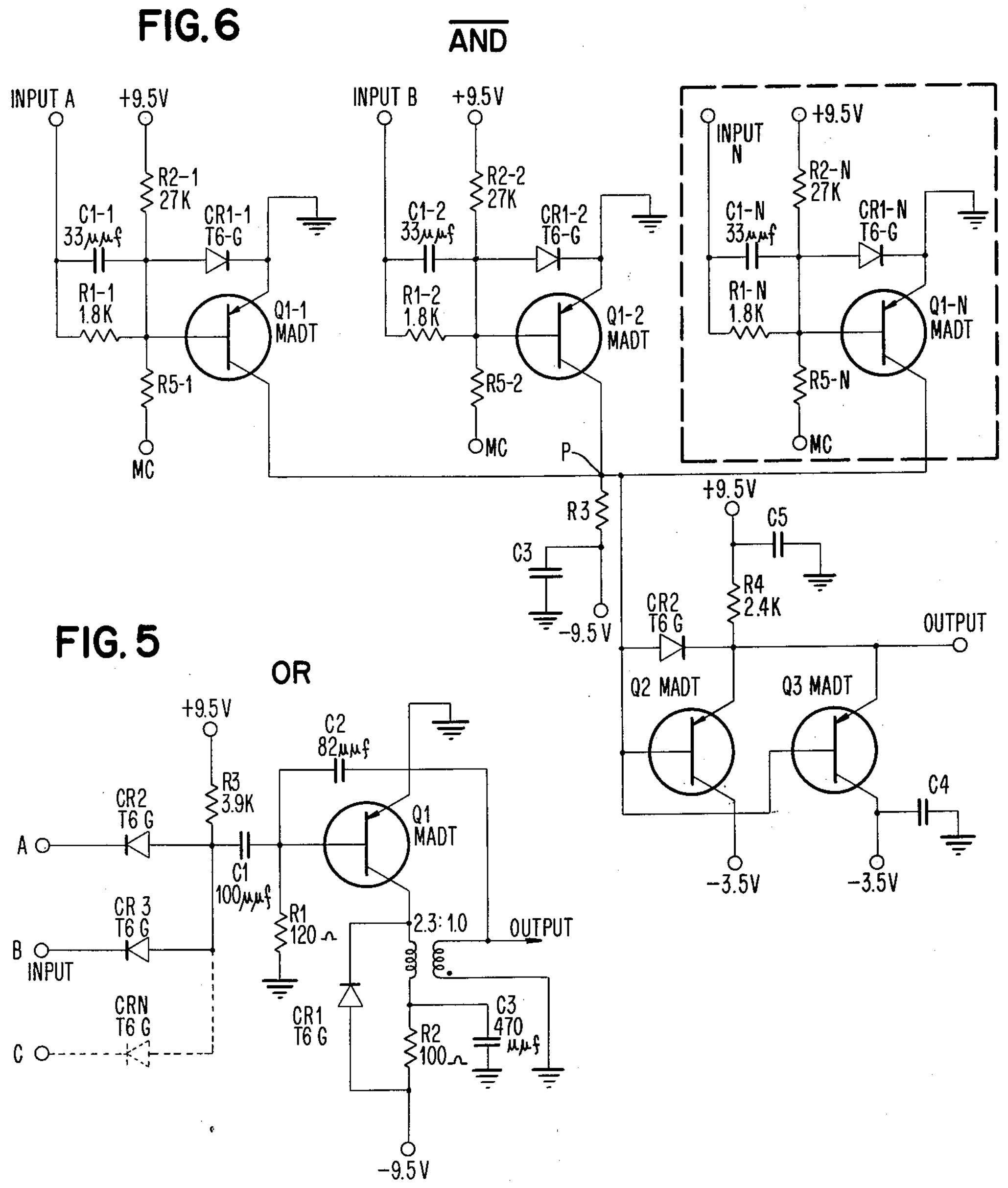
FIG. 5 is an example of an OR circuit shown in block form in FIGS. 1 and 2.
FIG. 6 is an example of an $\overline{\text{AND}}$, or AND NOT, circuit shown in block form in FIG. 2.

FIG. 5 is a schematic of an OR circuit that may be used for the OR circuits shown in block form in FIGS. 1 and 2. The appearance of a −3 volt signal at any of the input terminals labeled A, B, or C will produce a negative signal at the terminal marked "Output."

FIG. 6 is a schematic of an AND-NOT circuit, written as $\overline{\text{AND}}$, which may be employed in the embodiment of the invention shown in FIG. 2. The $\overline{\text{AND}}$ function carries out the logic $C=\overline{AB\ldots N}$. Consequently, in the schematic shown in FIG. 6, in order for a useable negative signal to appear at the output terminal of an $\overline{\text{AND}}$ gate 43, etc. there should be no negative signals as inputs to such $\overline{\text{AND}}$ gate. If any negative signal occurs on any input A, B, . . . N, then its corresponding transistor, for example $Q_1$–1 if a negative signal appears at input A, will conduct. Conduction of transistor $Q_1$–1 will cause point P to reach ground potential, cutting off transistors $Q_2$ and $Q_3$, resulting in no negative signal at the output of the $\overline{\text{AND}}$ gate. If all signals appearing at input A, input B and input N are at ground potential, then all transistors $Q_1$–1, $Q_1$–2 and $Q_1$–N are cut-off and point P would reach the value of −9.5 volts, were it not for the resistor $R_3$. The resistor $R_3$ is chosen so that the potential at point P is about −3.5 volts. This negative potential causes transistors $Q_2$ and $Q_3$ to conduct and a negative signal appears at the output terminal of the $\overline{\text{AND}}$ gate.

Returning to FIG. 2, it can be seen that the "1" outputs of flip-flops 2, 4 and 6 can be the −3.5 volt D.C. output levels of such flip-flops and their respective "0" states will be at ground potential. Assume that the flip-flops 2, 4, and 6 carry the instruction "111." The logic is carried out by connecting the $\overline{\text{AND}}$ gate 43 to all the "0" outputs of such flip-flops 2, 4, 6. Since the "0" levels for flip-flops 2, 4, and 6 are at ground potential, as was explained hereinabove, all the transistors $Q_1$–1, $Q_1$–2 and $Q_1$–3 of the $\overline{\text{AND}}$ circuit are cut-off and a negative signal appears at the output terminal of the $\overline{\text{AND}}$ gate 43. Such negative signal represents the instruction "111" and conditions gate 63. All the other $\overline{\text{AND}}$ gates 45, 47, . . . 57 will have at least one input at a −3.5 volt level, such negative input preventing a negative signal from appearing at the output terminal of its corresponding $\overline{\text{AND}}$ gate.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. An error checking circuit comprising a first register for storing instruction words in binary form, a parity flip-flop for storing the parity bit associated with a stored word and representative of correct instruction storage, and an alarm flip-flop, the latter being set to its alarm-indicating state at the same time that an instruction word is stored in said first register and its associated parity bit is stored in said parity flip-flop, a first gating means for decoding in pulse form the instruction word stored in said first register, two OR circuits and a second register of bistable elements, one OR circuit coupled to said first gating means so as to receive as inputs those decoded pulses that represent an even parity instruction and the second OR circuit being coupled to said first gating means so as to receive gated pulses representative of an odd parity instruction word, said second register being coupled to the output circuits of said first gating means whereby the operation of a single output circuit will set one of its bistable elements to its information-representing state at the same time that the remaining bistable elements of said second register are set to their respective non-information-representing state.

2. An error checking circuit comprising a first register for storing instruction words in binary form, a parity flip-flop for storing the parity bit associated with a stored word and representative of correct instruction storage, and an alarm flip-flop, the latter being set to its alarm-indicating state at the same time that an instruction word is stored in said first register and its associated parity flip-flop, a first set of decoding gates conditioned by said first register and a second set of decoding gates conditioned by said parity flip-flop, two OR circuits and a second register of bistable elements, means connecting the output circuits of said first set of decoding gates to said two OR circuits and to said second register of bistable elements, means for transmitting a sampling pulse through said first gating means so as to obtain a pulse output indicative of the binary word in said first register, said transmitted pulse setting one bistable element of the second register into its information-representing state and all other bistable elements of such second register into their respective non-information-representing states, said OR circuits being so connected to said first set of decoding gates that one OR circuit receives those transmitted pulses representative of an even parity instruction and the other OR circuit receives transmitted pulses representative of an odd parity instruction, the outputs of said OR circuits being fed to the second gating means, said second gating means transmitting output pulses of said OR circuits in accordance with the parity bit in said parity flip-flop so that proper transmission of a pulse through said second gating means will reset said alarm flip-flop to its no-alarm-indicating state but an improper transmission will activate an alarm circuit.

3. Error-checking means for an instruction register comprising a first register for storing instruction words in binary form, a parity flip-flop for storing the parity bit associated with such stored word and representative of correct instruction storage, and an alarm flip-flop, the latter being set to its alarm-indicating state at the same time that an instruction word is stored in said first register and its associated parity bit is stored in said parity flip-flop, a first set of decoding gates conditioned by said first register and adapted to pass a sampling pulse which represents a particular stored instruction, a second register connected to the output circuits of said first set of decoding gates for converting said instruction-decoding pulse into a single D.C. level representative of the stored word, two OR circuits, one being connected to said first set of decoding gates so as to receive decoded pulses representative of an even parity instruction and the other OR circuit being so connected to said same decoding gates so as to receive decoded pulses representative of an odd parity instruction, a second set of decoding gates conditioned by the state of said parity flip-flop and adapted to pass the pulses transmitted by said OR circuits, means for transmitting an alarm through said second decoding gating means when the state of the parity flip-flop is not in accord with the output of either OR circuit but transmitting a pulse to reset said alarm flip-flop to its no-alarm state if the output of either OR circuit is in accord with the state of said parity flip-flop.

4. An error checking circuit comprising a first register of bistable elements, a parity flip-flop and a first alarm flip-flop, means for setting each of said bistable elements in said first register in either of its two states so as to store an instruction word in binary form, means for setting said parity flip-flop to the state representative of correct instruction storage, and means for setting said alarm flip-flop to its alarm-indicating state, a first decoding gating means conditioned by said first register, a second decoding gating means conditioned by said parity flip-flop, two OR circuits, and a second register of bistable elements connected to the output circuits of said first set of decoding gates, means for transmitting a pulse through said first gating means wherein the latter will transmit the pulse in accordance with the particular binary word in said first register, said transmitted pulse setting one element of said second register to its information-bearing condition so as to obtain the instruction word in decoded form and resetting the remaining elements of said second register to their respective non-information bearing states as well as passing through one of said two OR circuits to sample the second decoding gating means, said OR circuits being connected to said first gating means so that all decoded pulses representative of an even parity instruction pass through one OR circuit and all decoded pulses representative of an even parity instruction pass through the second OR circuit, whereby a decoded pulse having the parity consistent with the parity bit in each parity flip-flop will reset said alarm flip-flop to its no-alarm-indicating state, a third group of gating means connected to said second register and conditioned by those bistable elements in the second register that are in their information-bearing conditions, and means for sampling such third group of gating means so as to determine which, if any, bistable elements in the second register are in their information-bearing condition, and means for transmitting said last gated pulses to the OR circuit corresponding to the parity of the binary word residing in decoded form in said second register.

5. Means for setting, at a first time interval, an instruction word in binary form into a first register of bistable elements and a parity flip-flop into its stable state that corresponds to the correct parity of the instruction word and a first alarm flip-flop to its alarm-indicating state, a first decoding gate circuit, conditioned by the unique stable states of said elements in said first register, two OR circuits, a second decoding gate circuit, and a second register of bistable elements, a gate for each element in such second register, means for providing at a second time interval a sampling pulse to said first decoding gate circuit so as to obtain the stored binary word in the form of a signal pulse, means for transmitting said sampling pulse through said first decoding gate circuit to either OR circuit and to said second register, such transmitted sampling pulse setting one bistable element in said second register to its operative state for conditioning its associated gate and setting all the remaining bistable elements in said second register to their respective inoperative states so as to decondition their respective gates as well as sampling the state of said second decoding gate circuit, the presence of proper parity in said parity flip-flop causing said sampling pulse to set said alarm flip-flop to its no-alarm-indicating state, means at a third time interval for testing the condition of said alarm flip-flop, means at a fourth time interval for sampling the gates associated with the bistable elements of said second register so as to transmit a gated pulse back to said OR circuits to test the proper selection of a bistable element in said second register, and means for testing whether two bistable elements of different parity in said second register are conditioning their respective associated gates.

References Cited in the file of this patent

UNITED STATES PATENTS

| | | |
|---|---|---|
| 2,719,959 | Hobbs | Oct. 4, 1955 |
| 2,871,289 | Cox et al. | Jan. 27, 1959 |
| 2,904,781 | Katz | Sept. 15, 1959 |